United States Patent [19]
Mayer

[11] 3,860,981
[45] Jan. 21, 1975

[54] ELECTRICAL INSTALLATION TOOL

[76] Inventor: John W. Mayer, 1508 Blackhawk Dr., Schaumburg, Ill. 60172

[22] Filed: Aug. 10, 1972

[21] Appl. No.: 279,716

[52] U.S. Cl............... 7/5.3, 30/90.1, 30/256, 81/9.5 R
[51] Int. Cl. .............................. H02q 1/12
[58] Field of Search ............... 7/5.4, 6, 5.3, 3 R, 4; 30/90.1, 256, 176; 81/9.5 R

[56] References Cited
UNITED STATES PATENTS

| 97,099 | 11/1869 | Manchester | 7/6 |
|---|---|---|---|
| 529,488 | 11/1894 | Gile | 81/9.5 R |
| 1,326,299 | 12/1919 | Smit | 30/256 |
| 1,529,237 | 3/1925 | Broecinski | 30/256 |
| 3,733,627 | 5/1973 | Epstein | 81/9.5 R |

FOREIGN PATENTS OR APPLICATIONS

| 14,187 | 0/1892 | Great Britain | 30/256 |
|---|---|---|---|
| 749,793 | 5/1956 | Great Britain | 81/9.5 R |
| 164,154 | 7/1958 | Sweden | 81/9.5 R |
| 197,047 | 7/1938 | Switzerland | 7/3 R |

*Primary Examiner*—Al Lawrence Smith
*Assistant Examiner*—Roscoe V. Parker

[57] ABSTRACT

An electrician's tool which includes two flat handle members connected at a scissors pivot. The working head of the tool has blade elements including wire stripping notches on both inner and outer edges of the head. With the inner edges of the head facing each other the inner edge wire stripping notches are aligned and as the head is closed to wire stripping position the notches form the stripping port or gap for stripping one gauge of wire, e.g., 14 gauge. The pivot permits the handle members to be pivoted around until the outer edges of the head face each other with their stripping notches aligned for forming another stripping gap for another gauge of wire, e.g., 12 gauge. The stop element stops the handles in proper stripping position with either pair of notches forming the proper size gap.

In a modified form the stop member is adjustable so that the stripping notches can be used to form stripping gaps for still other gauges of wire. In another modified form, a slot element is provided for use in breaking common ties which are present in electrical wall plug switches and the like.

The preferred form of tool also includes a screw driver element, a measuring element, a screw cutting element, a lug crimping element, and an eye element for use in bending wire ends into hook shape.

8 Claims, 5 Drawing Figures

PATENTED JAN 21 1975  3,860,981

ELECTRICAL INSTALLATION TOOL

BACKGROUND OF THE INVENTION

1. Field of the Invention

The present invention relates to all purpose combination tools for use by electricians and further relates to improvements in such tools.

2. Description of the Prior Art

Various combination electrician's tool have previously been proposed. Usually such tools merely combine the known elements of plurality of other tools. However, none of these prior combinations has permitted the electrician to perform all operations required for on-the-site installation of fixtures and the like. Consequently, electricians still use a heavy bag full of conventional tools while on the job. This is inconvenient and often expensive because tools become lost or stolen.

SUMMARY OF THE INVENTION

The present invention provides a new and useful electrician's tool and new and useful improvements in electrician's combination tools. Briefly, the tool is a scissors like tool that has cutting edges on both the inside and outside edges of the working head. The scissors pivot permits the head-forming members to pivot through a wide angle so that the outer edges of the head can engage each other. Thus, the tool can be reversed whereby the outer edges become the inner edges.

The outer edges of the working head and the inner edges of the working head have cooperating notches of different gauge sizes. Accordingly, with the inner edges of the head engaging each other, the gauge notches define a gauge gap having sharpened edges for stripping one particular gauge of wire. Likewise the outer edges have gauge notches of a different gauge so that when they are engaged they form a stripping gap of a different gauge size. In an advantageous form the tool is also provided with means for breaking common ties present in electrical fixtures.

The environment for the preferred embodiments is a tool which also includes a screw driver element, screw cutters, an eye for forming hooks in wires, and a measuring element. The modified form of the device is provided with a stop means for stopping the movement of the handle elements toward each other at the position where the gauge notches form the proper size gauge gap and the stop means is adjustable to adjust the size of the gap.

DESCRIPTION OF THE PREFERRED EMBODIMENTS

Figure 1:
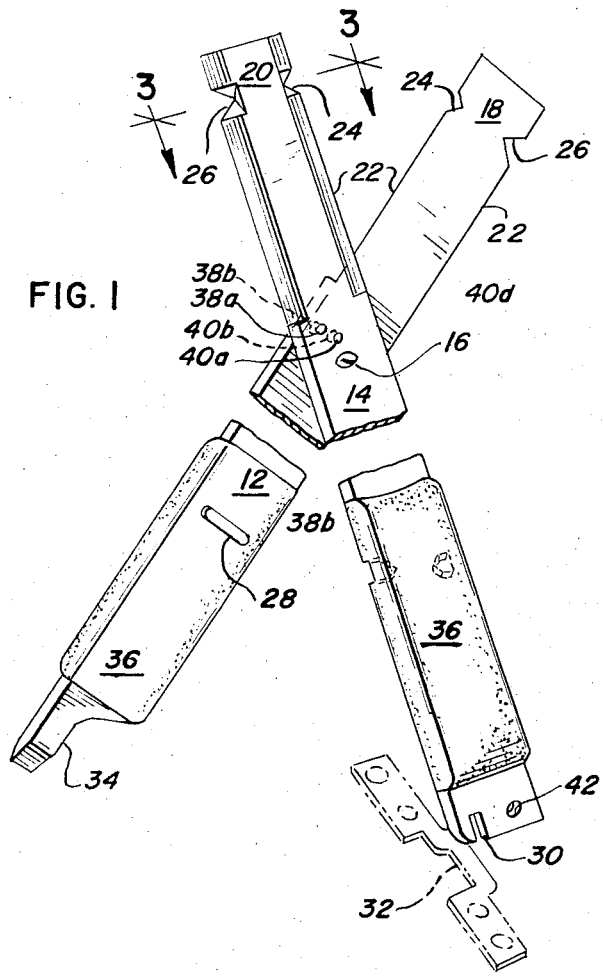
FIG. 1 is a perspective view of one form of tool of the present invention.

The electrician's tool shown in FIG. 1 includes a pair of handle members 12 and 14 mounted for scissors like movement relative to each other by pivot pin 16. Each of the handle members 12, 14 has a working element 18, 20 with cutting blade edges 22 at the inner and outer edges of each working element. Stripper notches 24 and 26 are provided in the cutting blade edges 22 for the purpose of forming a stripping port or gap for stripping insulation from a particular gauge of wire, e.g., 14 gauge for notches 24 or 12 gauge for notches 26. The notches can be color coded as to wire size.

As a further explanation of the stripping operation, a piece of insulated wire, say 12 gauge is placed between the notches 24 as the handles 12 and 14 are moved toward each other to close the space between the notches 24. An abutment 27 on handle 14 engages a stop lug 28 on handle 12 at the precise point when the cutting notches 24 have cut through the insulation of the wire but have not cut into the wire itself. The wire can then be pulled lengthwise to strip the insulation. Alternatively the handles can be used as knife edges to cut the insulation lengthwise to complete the stripping operation. If the device is used to strip wire at places other than wire ends, two spaced cuts are made with the notches 24 and blade 22 is then used to cut the insulation lengthwise from one cut on the wire to the other. The remaining insulation can then be simply pealed off.

Figure 2:
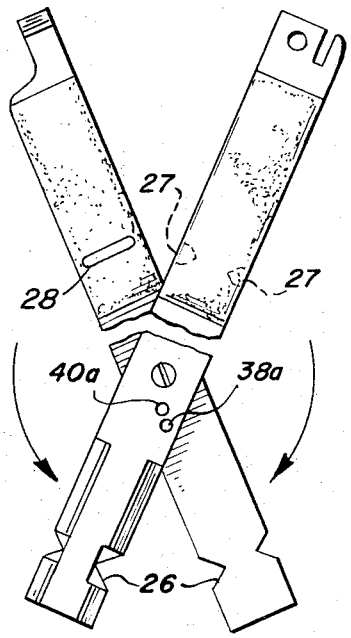
FIG. 2 is a perspective view of the tool of FIG. 1 with the outer edge gauge notches associated with each other to form a guage gap.

The tool is advantageously provided with a flip flop feature for the purpose of utilizing the stripper notches 26 for stripping another gauge of wire, e.g., 14 gauge. Handles 12 and 14 are pivoted relative to each other to a position shown in FIG. 2 with notches 26 facing each other and the stripping operation is conducted as above. The stop lug 28 is properly shaped and sized to again engage an abutment surface 27 on handle 14 at the precise spacing of notches 26 which permits cutting of the insulation without any cutting of the wire beneath.

In the device shown note that the notches 24 and 26 do not meet each other in abutment but would slide by each other were it not for the stop lug 28. However, the working elements can be formed so that they do abut and such abutment can eliminate the need for stop lug 28.

The device shown in FIG. 1 is also provided with a means for breaking common ties which are often present in electrical fixtures, such as in wall plugs and wall switches. The common tie breaker is shown in the form of a notch 30 in the butt end of handle member 14 and for receiving a common tie shown in phantom at 32. A prying motion with the tool will break the common tie from between the conductor plates in the fixture.

It will be noted that in the device of FIG. 1 the handle member 12 terminates in a screw driver element 34 which is useful in loosening and tightening screws in electrical fixtures. It is also useful in separating some receptical ties so that between elements 30 and 34 all can be split. Extra leverage can be applied to the screw driver by using handle 14 as a crossbar.

The handle members 12 and 14 are reduced in thickness throughout a gripping area to receive electrical insulation 36 for covering the metal conductive handle members, as a safety precaution. The handle members are also provided with screw cutters 38 and 40 which can be used for cutting the screw size most commonly used in electrical fixtures, i.e., No. 8×32 and No. 6×32. Each of the screw cutters includes a tapped bore 38a, 40a, in handle member 14 to which the screws are threaded with the other bore 38b, 40b in registery. The bores 38b, 40b are oversized slightly and provided with cutting edges so that when the handle members 12 and 14 are gripped and urged toward each other the cutting edges sever the screw. The cut screw can then be removed from the bore 38a, 40a.

The tool shown in FIG. 1 also includes an eye 42 for forming a hook in an end portion of wire which has been stripped of insulation. The stripped wire end is simply inserted into the eye 42 and bent using the tool for leverage.

Figure 3:
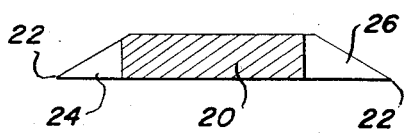
FIG. 3 is a section through tool of FIG. 1 taken generally along line 3—3 of FIG. 1.
Figure 4:
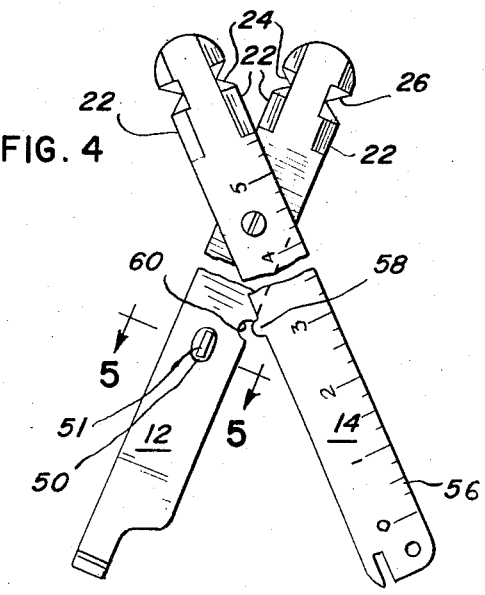
FIG. 4 is a diagramatic side plan view illustrating modifications of the tool of this invention.
Figure 5:
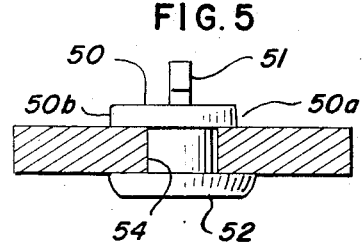
FIG. 5 is a section along line 5—5 of FIG. 4.

In FIG. 4 there is illustrated diagramatically a modified form of the device. This form is in many ways somewhat simpler than that shown in FIGS. 1 through 3. However the stop lug 28 is provided in the form of a gauge adjusting cam member 50 having a turning handle 51. Cam member 50 is secured to and rotatable with a pivot pin 52 mounted through handle member 14. The pivot pin 52 is snuggly received in a bore 54 in the handle and although it can be manually rotated it resists rotation due to friction against the walls of bore 54.

It will be seen that cam member 50 can be turned back and forth between a position where the low 50a of cam 50 engages handle 12 during the stripping operation and a position where the high 50b of cam member 50 engages the handle 12 in stripping position. The cam member is of proper shape and size to provide for the stripping of two different gauges of wire by notches 24 and 26, e.g., 12 and 14 gauge, when the low surface 50a is presented to handle 12. When the cam member 50 is rotated to present its high surface 50b to handle 12, the notches 24 or 26 will move slightly closer together for the purpose of stripping a smaller gauge wire, e.g., 16 or 18 gauge. The device of FIG. 4 is also provided with measuring element 56 along an edge of handle member 12 for measuring ⅛ inch increments.

The device in FIG. 4 also includes a system for crimping lugs for solderless connections. Accordingly a receiver 60 is provided on the inner edge of handle member 12 for receiving the lug and bare wire. As the handles are moved together, a projection 58, smaller than receiver 60, is pressed against the lug and wire to crimp the lug and thereby connect it to the bare wire.

FIG. 4 also illustrates a modified form of blades 22 which taper from both faces of elements 18 and 20 to a central edge, more like knife blades than scissors blades. Although this results in notches 24 (or 26) being off-set when the stripping port is formed, the device works just as well for stripping purposes. Further, the off-set may often be preferred since it can permit slightly greater tolerance in sizing the notches 24 and 26. There is very little play due to the off-set.

The electrician's tool provided by the present invention is a labor saving device which enables an electrician to install a greater number of electrical devices, e.g., at least 25% more installations in a given time. It saves the electrician the trouble of having to select different tools for operations during the installation. The tool is a compact hand size unit and can be very small, e.g., about 5 inches in length. It can be easily carried in a shirt pocket.

As has been seen the tool includes a scissors type wire stripper, a knife like insulation skinner, a screw cutter, a screw driver, a wire loop former and a circuit separator. The tool can be provided with an insulated grip. In the form of tool shown in FIG. 1 the handles can be turned around 350° to change the wire skinning notches from one gauge to another. The wire skinning notches are properly sized and are stopped in their movement toward each other to form a precisely sized gap. This prevents scoring and weakening of the conductor during the insulation cutting operation.

The foregoing detailed description has been given for clearness of understanding only and no unnecessary limitations should be understood therefrom as some modifications will be obvious to those skilled in the art.

I claim:

1. An electrician's tool comprising two rigid elongated work members each having a handle element and a work element, means mounting said members for pivotal movement relative to each other whereby movement of the handle elements toward each other moves the work elements from an open position to a first closed position into working association with each other, each of said work elements having inner and outer opposite edges comprising knife blade means each including aligned wire receiving notch means, the notch means on said inner edges forming a first wire gauge gap with said work elements in said first closed position, said work elements being pivotal away from said first closed position through the open position to a second closed position with the outer edges in facing working association with each other and the aligned outer edge notches forming a second wire gauge gap, and stop means for stopping the pivotal movement of said inner edges toward each other and said outer edges toward each other in said respective closed positions with said notches forming a precise gauge wire receiver whereby the bladed notches cut the insulation on the wire without cutting into the wire.

2. The device of claim 1 including means for breaking common ties in electrical fixtures.

3. The device of claim 2 wherein said breaking means is a notch in one of said work members.

4. The device of claim 1 including a screw driver element forming the butt end of one of said handle elements, whereby the other handle element, when moved to a position normal to the screw driver element, can be used for screw driving leverage.

5. The device of claim 1 wherein said stop means is an adjustable cam means for adjusting the gap between said notch means in each closed position to accommodate different sizes of wires.

6. The device of claim 1 including an eye in one of said work members for bending a hook in an end bare portion of insulated wire.

7. The device of claim 1 including a measuring element on one of said work members.

8. The device of claim 1 including screw cutter means in said work members for cutting screws as said handle elements are moved to a closed position.

* * * * *